July 8, 1958    C. J. HUPP    2,842,188
SPRING CUSHION STRUCTURES
Filed July 19, 1954
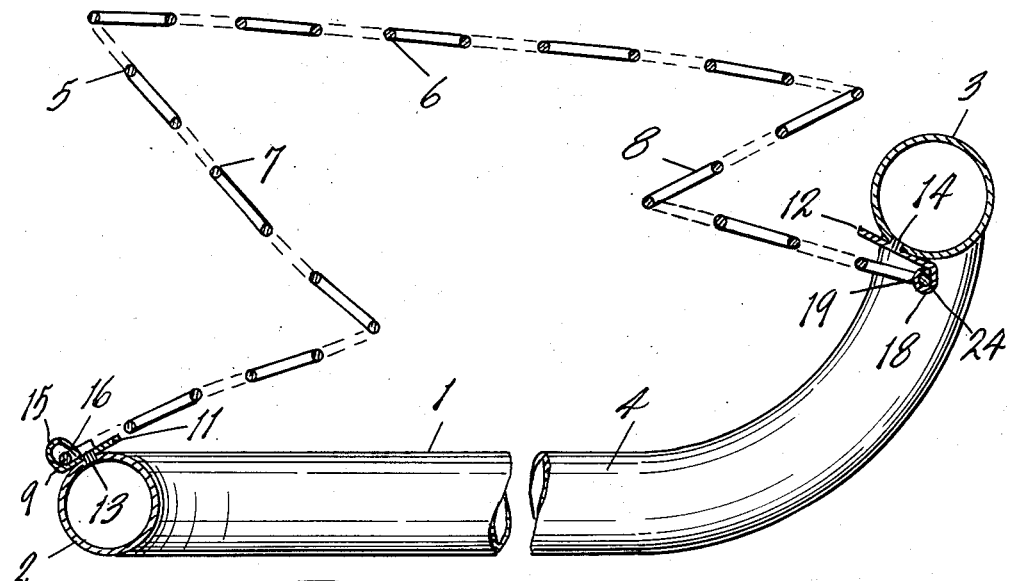
Fig. 1.
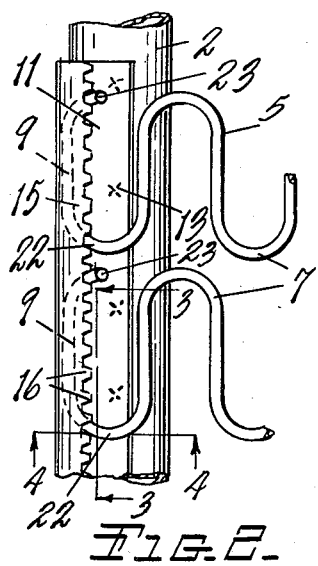
Fig. 2.
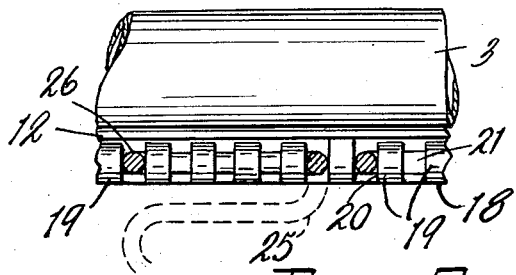
Fig. 6.
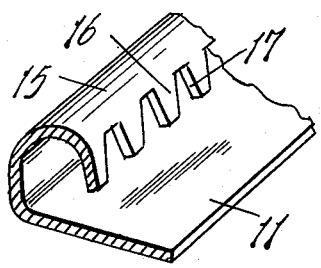
Fig. 5.
Fig. 4.
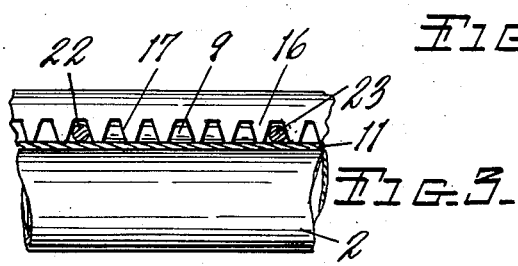
Fig. 3.
INVENTOR.
Charles J. Hupp
BY
Otto A. Earl
Attorney.

United States Patent Office 2,842,188
Patented July 8, 1958

2,842,188

SPRING CUSHION STRUCTURES

Charles J. Hupp, Detroit, Mich., assignor to L. A. Young Spring & Wire Corporation, Detroit, Mich., a corporation of Michigan Application July 19, 1954, Serial No. 444,078

6 Claims. (Cl. 155—179)

This invention relates to spring cushion structures, both the seats and backs of various types of spring cushions.

The main objects of the invention are:

First, to provide a spring structure which is well adapted for embodiment in the seat and back cushions.

Second, to provide improved means for mounting sinuous bent or zig-zag spring elements on supporting frames and means which permit very rapid assembling of the spring elements in selected positions and with a minimum of effort on the part of the assembler.

Third, to provide a structure having these advantages which is very economical and at the same time provides a strong and secure means for supporting the springs.

Further objects relating to details and economies of the invention will appear from the description to follow. The invention is defined and pointed out in the claims.

A preferred embodiment of the invention is illustrated in the accompanying drawing, in which:

Fig. 1 is a fragmentary transverse section of a spring structure embodying my invention as adapted or embodied for use in a vehicle seat.

Fig. 2 is a fragmentary top view of the front supporting frame and the spring parts attached thereto.

Fig. 3 is a fragmentary view in section on a line corresponding to line 3—3 of Fig. 2.

Fig. 4 is a fragmentary view in section on a line corresponding to line 4—4 of Fig. 2.

Fig. 5 is a fragmentary perspective view of one of the supporting bars with the spring retaining flange in open position.

Fig. 6 is a fragmentary view of the rear frame member with a spring supporting bar attached thereto.

In the accompanying drawing 1 represents a base frame which is formed of tubing and comprises a front member 2, a rear member 3, and a connecting member 4. The rear frame member 3 is disposed in a plane substantially above the plane of the front frame member.

The sinuously bent or zig-zag spring elements designated generally with the numeral 5 comprises seating portions 6, a downwardly projecting front supporting portion 7 integral therewith, and a downwardly projecting rear supporting portion 8 also integral with the seating portion. These supporting portions 7 and 8 are of angular shape and add to the resilience of the spring element and are designed to support the seating portion of the spring element at the desired elevation relative to the frame.

The spring elements have terminal reaches 9, the reaches terminating in inturned lugs 10, the spring elements are supported and connected to the frame members by means of bars 11 and 12, the bar 11 being secured to the upper side of the front frame member 2 as by spot welds 13, while the bar 12 is secured to the underside frame member 3 as by the spot welds 14. These attaching bars thus become in effect a part of the frame members. The attaching bar 11 has an upwardly projecting inwardly curved flange 15 at its outer edge, the flange at its edge being provided with a series of uniformly spaced downwardly directed teeth 16, or its edge is serrated to provide these teeth which preferably have downwardly converging edges 17. The teeth are spaced inwardly from the inner edge of the bar.

The bar 12 is provided with a downwardly projecting inwardly curved flange 18 corresponding generally to the flange 15, the flange having on its edge a series of upwardly projecting teeth 19 spaced inwardly from its inner edge. The edges 20 of these teeth are desirably parallel, as shown in Fig. 6, their tips 21, however, being preferably tapered. The purpose of this is that there is a pivotal engagement of the rear ends of the spring elements with the teeth of the supporting bar 12.

With the supporting bars mounted on the frame members, the front terminal reaches of the spring elements are disposed within the flanges of the supporting bar 11 in thrust supporting engagement therewith and with the bight portion 22 thereof between an adjacent pair of the teeth, as is shown in Figs. 2 and 3, and the terminal lug 23 of the reach 22 is disposed between another pair of teeth. The flange is then bent downwardly to close the teeth upon the supporting bar with the end reach of the spring element within the flange. The teeth of the supporting member 11 are so shaped and spaced that they clampingly engage the parts disposed between them, as shown in Fig. 3.

The end loop of the spring element is supported upon the supporting bar so that in effect the end of the downwardly projecting spring supporting portion 7 is fulcrumed on the supporting bar 11. The rear reach 24 of the spring element is disposed within the flange 18 of the rear supporting bar in pivotal thrust supporting engagement therewith and with the bight portion 25 and the terminal lug 26 between adjacent pairs of teeth and the flange bent to close the teeth around the rear reach 24. The teeth 19 are desirably wrapped upon the reaches 24 to complete the bearing therefor.

The parallel side edges of the teeth 19 permit a rotating or pivotal movement of the reach 24 on the rear support. The support 12 however, serves as a stop to limit the upward movement of the supporting arm 8 attached thereto.

This structure is very economical to produce, is strong and rigid and greatly facilitates the assembling of the spring elements. The spring elements may be assembled closely together, as is shown in Fig. 2, or they may be variably spaced to produce the load carrying capacity desired from any part of the spring structure.

No particular skill or effort is required in the assembling as the terminals of the spring element are merely slipped into place and the flanges are bent around the same. This may be done with a hand tool and only the spring element engaging portions may be clamped thereon, if desired, although the flange may be closed its entire length with the hand tool, or by means of a suitable press.

I have illustrated and described my invention in a highly practical embodiment thereof. I have not attempted to illustrate or describe other embodiments or adaptations as it is believed that this disclosure will enable those skilled in the art to embody or adapt my invention, as may be desired.

Having thus described my invention, what I claim as new and desire to secure by Letters Patent is:

1. A spring assembly comprising a plurality of sinuously bent laterally spaced spring elements having terminal reaches provided with laterally projecting lugs at their ends and an elongated supporting bar for said spring elements comprising a body portion of flat section having an inturned bendable flange on its outer edge, the flange having a series of uniformly spaced teeth on its edge directed toward the face of the supporting bar and spaced outwardly from the inner edge of the bar, the said terminal reaches of the spring elements being disposed within and in thrust supported engagement with said inturned flange with the connecting bights thereof and the said lugs disposed between pairs of said teeth and retainingly engaged thereby with the ends of the teeth in engagement with the supporting bar and in outwardly spaced relation relative to the inner edge of the bar.

2. A spring assembly comprising a plurality of sinuously bent laterally spaced spring elements having terminal reaches, and an elongated supporting bar for said spring elements comprising a body portion of flat section having an inturned bendable flange on its outer edge, the flange having a series of uniformly spaced teeth on its edge directed toward the face of the supporting bar and spaced outwardly from the inner edge of the bar, the said terminal reaches of the spring elements being disposed within and in thrust supported engagement with said inturned flange with the connecting bights thereof disposed between pairs of said teeth and retainingly engaged thereby with the ends of the teeth in engagement with the supporting bar and in outwardly spaced relation relative to the inner edge of the bar.

3. A spring assembly comprising a plurality of laterally spaced spring elements having terminal portions and an elongated supporting bar having an inturned bendable flange on its outer edge, the flange having a series of teeth on its edge directed toward the face of the supporting bar and spaced outwardly from the inner edge thereof, the said terminal portions of the spring elements being disposed within and in supported engagement with said inturned flange with portions of the spring elements disposed between pairs of said teeth with the ends of the teeth in engagement with the face of the supporting bar and spaced outwardly relative to the inner edge of the bar.

4. A spring assembly comprising a plurality of laterally spaced spring elements having terminal portions and an elongated supporting bar having an inturned bendable flange on its outer edge, the flange having a series of teeth on its edge directed toward the face of the supporting bar and spaced outwardly from the inner edge thereof, the said terminal portions of the spring elements being disposed within and in supported engagement with said inturned flange with portions of the spring elements disposed between pairs of said teeth with the teeth spaced outwardly relative to the inner edge of the bar.

5. A spring assembly comprising a plurality of spring elements, and an elongated supporting bar for said spring elements having an inturned flange on its outer edge, the flange having a series of teeth on its edge directed toward the supporting bar and spaced outwardly from the inner edge thereof, the said spring elements having portions thereof disposed in thrust supported engagement with said inturned flange with portions of the spring elements disposed between pairs of said teeth and retainingly engaged thereby with the ends of the teeth in engagement with the face of the supporting bar and in outwardly spaced relation relative to the inner edge thereof.

6. A spring assembly comprising a plurality of spring elements, and an elongated supporting bar for said spring elements having an inturned flange on its outer edge, the flange having a series of teeth on its edge directed toward the supporting bar and spaced outwardly from the inner edge thereof, the said spring elements having portions thereof disposed in thrust supported engagement with said inturned flange with portions of the spring elements disposed between pairs of said teeth and retainingly engaged thereby with the teeth in outwardly spaced relation relative to the inner edge thereof.

References Cited in the file of this patent

UNITED STATES PATENTS

| | | |
|---|---|---|
| 1,182,276 | Jacobs et al. | May 9, 1916 |
| 1,246,081 | Genge | Nov. 13, 1917 |
| 1,544,872 | Trimble | July 7, 1925 |
| 1,694,359 | Trimble | Dec. 4, 1928 |
| 2,568,829 | Scott et al. | Sept. 25, 1951 |
| 2,670,786 | Wolofski | Mar. 2, 1954 |